(12) United States Patent
Ryder et al.

(10) Patent No.: US 11,532,104 B2
(45) Date of Patent: Dec. 20, 2022

(54) METHOD AND DATA PROCESSING SYSTEM FOR LOSSY IMAGE OR VIDEO ENCODING, TRANSMISSION AND DECODING

(71) Applicant: DEEP RENDER LTD, London (GB)

(72) Inventors: Thomas Ryder, London (GB);
Alexander Lytchier, London (GB);
Vira Koshkina, London (GB);
Christian Besenbruch, London (GB);
Arsalan Zafar, London (GB)

(73) Assignee: DEEP RENDER LTD., London (GB)

( * ) Notice: Subject to any disclaimer, the term of this patent is extended or adjusted under 35 U.S.C. 154(b) by 0 days.

(21) Appl. No.: 17/748,551

(22) Filed: May 19, 2022

(65) Prior Publication Data

US 2022/0277492 A1 Sep. 1, 2022

Related U.S. Application Data

(63) Continuation of application No. PCT/EP2021/085068, filed on Dec. 9, 2021.

(30) Foreign Application Priority Data

Dec. 10, 2020 (GB) ..................................... 2019531

(51) Int. Cl.
*G06K 9/36* (2006.01)
*G06K 9/46* (2006.01)
(Continued)

(52) U.S. Cl.
CPC ........... *G06T 9/002* (2013.01); *G06N 3/0454* (2013.01); *G06N 3/08* (2013.01); *G06T 3/4046* (2013.01); *G06V 10/25* (2022.01)

(58) Field of Classification Search
CPC ..... G06T 9/002; G06T 3/4046; G06N 3/0454; G06N 3/08; G06V 10/25
(Continued)

(56) References Cited

U.S. PATENT DOCUMENTS

| 10,965,948 | B1* | 3/2021 | Appalaraju | .......... H04N 19/124 |
| 2020/0304147 | A1* | 9/2020 | Choi | ................... H03M 7/3059 |

(Continued)

OTHER PUBLICATIONS

Agustsson, Eirikur, et al., Generative adversarial networks for extreme learned image compression. In Proceedings of the IEEE International Conference on Computer Vision, pp. 221-231, 2019.
(Continued)

*Primary Examiner* — Charlotte M Baker
(74) *Attorney, Agent, or Firm* — Saul Ewing Arnstein & Lehr LLP

(57) ABSTRACT

A method for lossy image or video encoding, transmission and decoding, the method comprising the steps of: receiving an input image at a first computer system; encoding the input image using a first trained neural network to produce a latent representation; identifying one or more regions of the input image associated with high visual sensitivity; encoding the one or more regions of the input image associated with high visual sensitivity using a second trained neural network to produce one or more region latent representations; performing a quantization process on the latent representation and the one or more region latent representations; transmitting the result of the quantization process to a second computer system; decoding the result of the quantization process to produce an output image, wherein the output image is an approximation of the input image.

20 Claims, 10 Drawing Sheets

(51) Int. Cl.
   *G06T 9/00*   (2006.01)
   *G06T 3/40*   (2006.01)
   *G06N 3/08*   (2006.01)
   *G06N 3/04*   (2006.01)
   *G06V 10/25*  (2022.01)

(58) Field of Classification Search
   USPC .......................................................... 382/232
   See application file for complete search history.

(56) References Cited

U.S. PATENT DOCUMENTS

| | | | |
|---|---|---|---|
| 2020/0372686 A1* | 11/2020 | Wen ......................... | G06T 9/002 |
| 2021/0142524 A1* | 5/2021 | Djelouah ............. | H04N 19/126 |
| 2021/0360259 A1* | 11/2021 | Wang ................... | H04N 19/172 |
| 2021/0390335 A1* | 12/2021 | Du ......................... | G06V 20/17 |
| 2021/0397895 A1* | 12/2021 | Sun ........................ | G06K 9/623 |
| 2022/0103839 A1* | 3/2022 | Van Rozendaal ...... | G06N 3/088 |

OTHER PUBLICATIONS

Goodfellow, Ian, et al., "Generative adversarial nets". In Advances in neural information processing systems, pp. 2672-2680, 2014.
Mentzer, Fabian, et al., High-fidelity generative image compression. Advances in Neural Information Processing Systems, 33, 2020.
Perez, Patrick, et al., "Poisson image editing". ACM Trans. Graph., 22(3), 2003.
Zhang, Richard, et al., The unreasonable effectiveness of deep features as a perceptual metric. In Proceedings of the IEEE conference on computer vision and pattern recognition, pp. 586-595, 2018.

* cited by examiner

METHOD AND DATA PROCESSING SYSTEM FOR LOSSY IMAGE OR VIDEO ENCODING, TRANSMISSION AND DECODING

CROSS-REFERENCE TO RELATED APPLICATIONS

This is a continuation of PCT Application No. PCT/EP2021/085068, filed on Dec. 9, 2021, which claims priority to GB Application No. GB2019531.9, filed Dec. 10, 2020, the entire contents of which being fully incorporated herein by reference.

FIELD OF THE INVENTION

This invention relates to a method and system for lossy image or video encoding, transmission and decoding, a method, apparatus, computer program and computer readable storage medium for lossy image or video encoding and transmission, and a method, apparatus, computer program and computer readable storage medium for lossy image or video receipt and decoding.

There is increasing demand from users of communications networks for images and video content. Demand is increasing not just for the number of images viewed, and for the playing time of video; demand is also increasing for higher resolution content. This places increasing demand on communications networks and increases their energy use because of the larger amount of data being transmitted.

To reduce the impact of these issues, image and video content is compressed for transmission across the network. The compression of image and video content can be lossless or lossy compression. In lossless compression, the image or video is compressed such that all of the original information in the content can be recovered on decompression. However, when using lossless compression there is a limit to the reduction in data quantity that can be achieved. In lossy compression, some information is lost from the image or video during the compression process. Known compression techniques attempt to minimise the apparent loss of information by the removal of information that results in changes to the decompressed image or video that is not particularly noticeable to the human visual system. Artificial intelligence (AI) based compression techniques achieve compression and decompression of images and videos through the use of trained neural networks in the compression and decompression process. Typically, during training of the neutral networks, the difference between the original image and video and the compressed and decompressed image and video is analyzed and the parameters of the neural networks are modified to reduce this difference while minimizing the data required to transmit the content. However, AI based compression methods may achieve poor compression results when applied to images or videos including large amounts of content which is particularly noticeable to the human visual system.

According to the present invention there is provided a method for lossy image or video encoding, transmission and decoding, the method comprising the steps of: receiving an input image at a first computer system; encoding the input image using a first trained neural network to produce a latent representation; identifying one or more regions of the input image associated with high visual sensitivity; encoding the one or more regions of the input image associated with high visual sensitivity using a second trained neural network to produce one or more region latent representations; performing a quantization process on the latent representation and the one or more region latent representations; transmitting the result of the quantization process to a second computer system; decoding the result of the quantization process to produce an output image, wherein the output image is an approximation of the input image.

The one or more regions of the input image associated with high visual sensitivity may be identified by a third trained neural network.

The location of the areas of the one or more regions of the input image associated with high visual sensitivity may be stored in a binary mask.

The method may further comprise the step of transmitting the binary mask to the second computer system.

The method may further comprise the step of transmitting location information identifying the location of the one or more of the regions of the input image associated with high visual sensitivity to the second computer system.

The quantization process may comprise quantizing the first latent representation to produce a quantized latent and quantizing the one or more region latent representations to produce one or more quantized region latents; and the step of transmitting the result of the quantization process may comprise transmitting the quantized latent and the one or more quantized region latents.

The step of decoding the result of the quantization process may comprise: decoding the quantized latent using a fourth trained neural network to produce an intermediate image; decoding the one or more quantized region latents using a fifth trained neural network to produce one or more output region images; and combining the intermediate image and the one or more output region images to produce the output image.

The intermediate image and the one or more region images may be combined using Poisson Blending.

The intermediate image and the one or more region images may be combined using a sixth trained neural network.

The step of decoding the result of the quantization process may comprise: decoding the quantized latent and the one or more quantized region latents using a seventh trained neural network to produce the output image.

The quantized latent and the one or more quantized region latents may be input into separate layers of the seventh trained neural network; and information corresponding to both of the quantized latent and the one or more quantized region latents may be input into a subsequent layer of the seventh trained neural network.

The method may further comprise: combining the quantized latent and the one or more quantized region latents to produce a quantized combined latent; wherein the step of transmitting the result of the quantization process comprises transmitting the quantized combined latent.

The step of decoding the result of the quantization process may comprises decoding the quantized combined latent using an eighth trained neural network.

The method may further comprise the step of merging the latent representation and the one or more region latent representations to produce a merged latent representation; and quantizing the merged latent representation to produce a quantized merged latent; wherein the step of transmitting the result of the quantization process comprises transmitting the quantized merged latent.

The step of decoding the result of the quantization process may comprise decoding the quantized merged latent using a ninth trained neural network.

The method may further comprise the steps of: encoding the latent representation using a tenth trained neural network to produce a hyper-latent representation quantizing the hyper-latent representation to produce a quantized hyper-latent; and transmitting the quantized hyper-latent to the second computer system; wherein the decoding of the result of the quantization process to produce an output image uses the quantized hyper-latent.

The method may further comprise the steps of: encoding the one or more region latent representations using a eleventh trained neural network to produce one or more region hyper-latent representations quantizing the one or more region hyper-latent representations to produce one or more quantized region hyper-latents; and transmitting the one or more quantized region hyper-latents to the second computer system; wherein the decoding of the result of the quantization process to produce an output image uses the one or more quantized region hyper-latents.

The one or more regions of high visual sensitivity may include a plurality of categories of region; and an additional trained neural network may be used to encode each category of region during the encoding of the one or more regions of high visual sensitivity.

According to the present invention there is provided a method of training one or more neural networks, the one or more neural networks being for use in lossy image or video encoding, transmission and decoding, the method comprising the steps of: receiving a first input training image; encoding the first input training image using a first neural network to produce a latent representation; identifying one or more regions of the input image associated with high visual sensitivity; encoding the one or more regions of the input image associated with high visual sensitivity using a second trained neural network to produce one or more region latent representations; performing a quantization process on the latent representation and the one or more region latent representations; decoding the result of the quantization process to produce an output image, wherein the output image is an approximation of the input training image evaluating a loss function based on differences between the output image and the input training image; evaluating a gradient of the loss function; back-propagating the gradient of the loss function through the first neural network to update the parameters of the first neural network; repeating the above steps using a first set of training images to produce a first trained neural network.

The method may further comprise, prior to the step of encoding the first input training image, performing the steps of: receiving a second input training image; encoding the second input training image using a second neural network to produce a latent representation; performing a quantization process on the latent representation; decoding the result of the quantization process to produce an output image, wherein the output image is an approximation of the second input training image evaluating a loss function based on differences between the output image and the second input training image; evaluating a gradient of the loss function; back-propagating the gradient of the loss function through the second neural network to update the parameters of the second neural network; repeating the above steps using a second set of training images to produce a second trained neural network.

The same set of training images may be used to produce the first trained neural network and the second trained neural network.

The set of training images may be cropped to the one or more regions of the input image associated with high visual sensitivity when used to produce the second trained neural network.

The difference between the output image and the input training image is determined by a neural network acting as a discriminator; and back-propagation of the gradient of the loss function is additionally used to update the parameters of the neural network acting as a discriminator.

According to the present invention there is provided a method for lossy image or video encoding and transmission, the method comprising the steps of: receiving an input image at a first computer system; encoding the input image using a first trained neural network to produce a latent representation; identifying one or more regions of the input image associated with high visual sensitivity; encoding the one or more regions of the input image associated with high visual sensitivity using a second trained neural network to produce one or more region latent representations; performing a quantization process on the latent representation and the one or more region latent representations; and; transmitting the result of the quantization process.

According to the present invention there is provided a method for lossy image or video receipt and decoding, the method comprising the steps of: receiving the result of the quantization process transmitted according to the method for lossy image or video encoding and transmission described above at a second computer system; decoding the result of the quantization process to produce an output image, wherein the output image is an approximation of the input image.

According to the present invention there is provided a data processing system configured to perform the method for lossy image or video encoding, transmission and decoding described above.

According to the present invention there is provided a data processing apparatus configured to perform the method for lossy image or video encoding and transmission or the method for lossy image or video receipt and decoding described above.

According to the present invention there is provided a computer program comprising instructions which, when the program is executed by a computer, cause the computer to carry out the method for lossy image or video encoding and transmission or the method for lossy image or video receipt and decoding described above.

According to the present invention there is provided a computer-readable storage medium comprising instructions which, when executed by a computer, cause the computer to carry out the method for lossy image or video encoding and transmission or the method for lossy image or video receipt and decoding described above.

Aspects of the invention will now be described by way of examples, with reference to the following figures in which.

Figure 6:
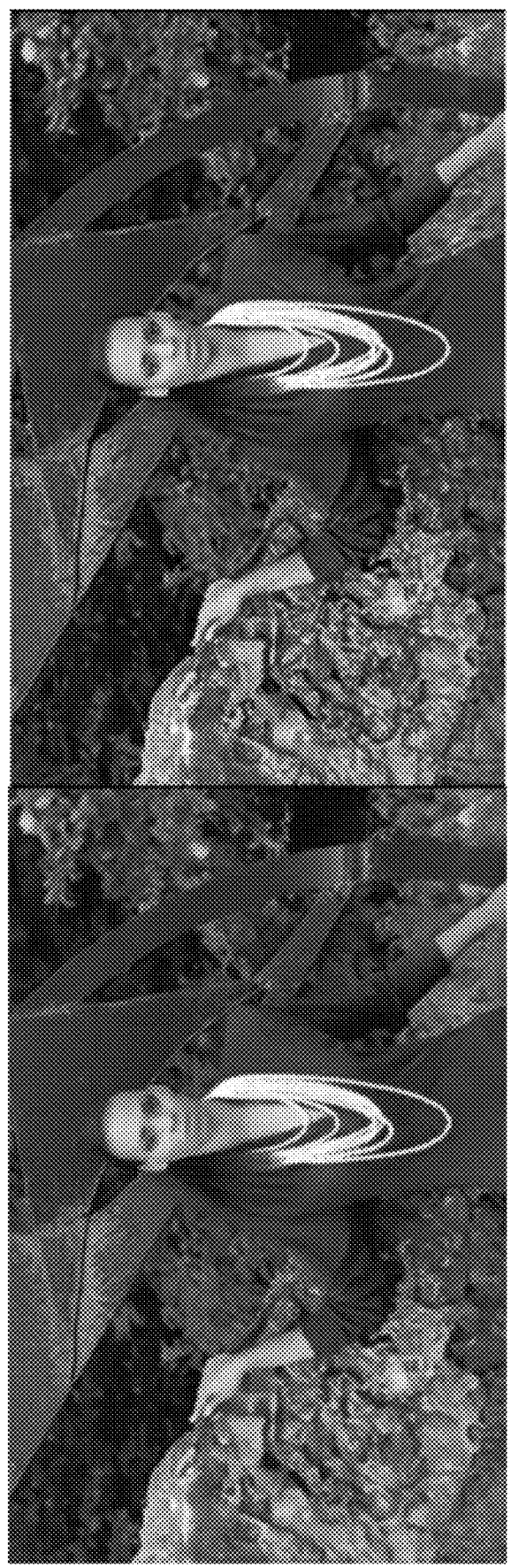

FIG. 6 compares an image compressed and decompressed with an AI based compression and decompression process and an AI based compression and decompression process according to the present invention.

Figure 7:

FIG. 7 compares an image containing multiple faces compressed and decompressed with an AI based compression and decompression process and an AI based compression and decompression process according to the present invention.

Figure 8:

FIG. 8 compares an image containing text compressed and decompressed with an AI based compression and decompression process and an AI based compression and decompression process according to the present invention.

Figure 9:
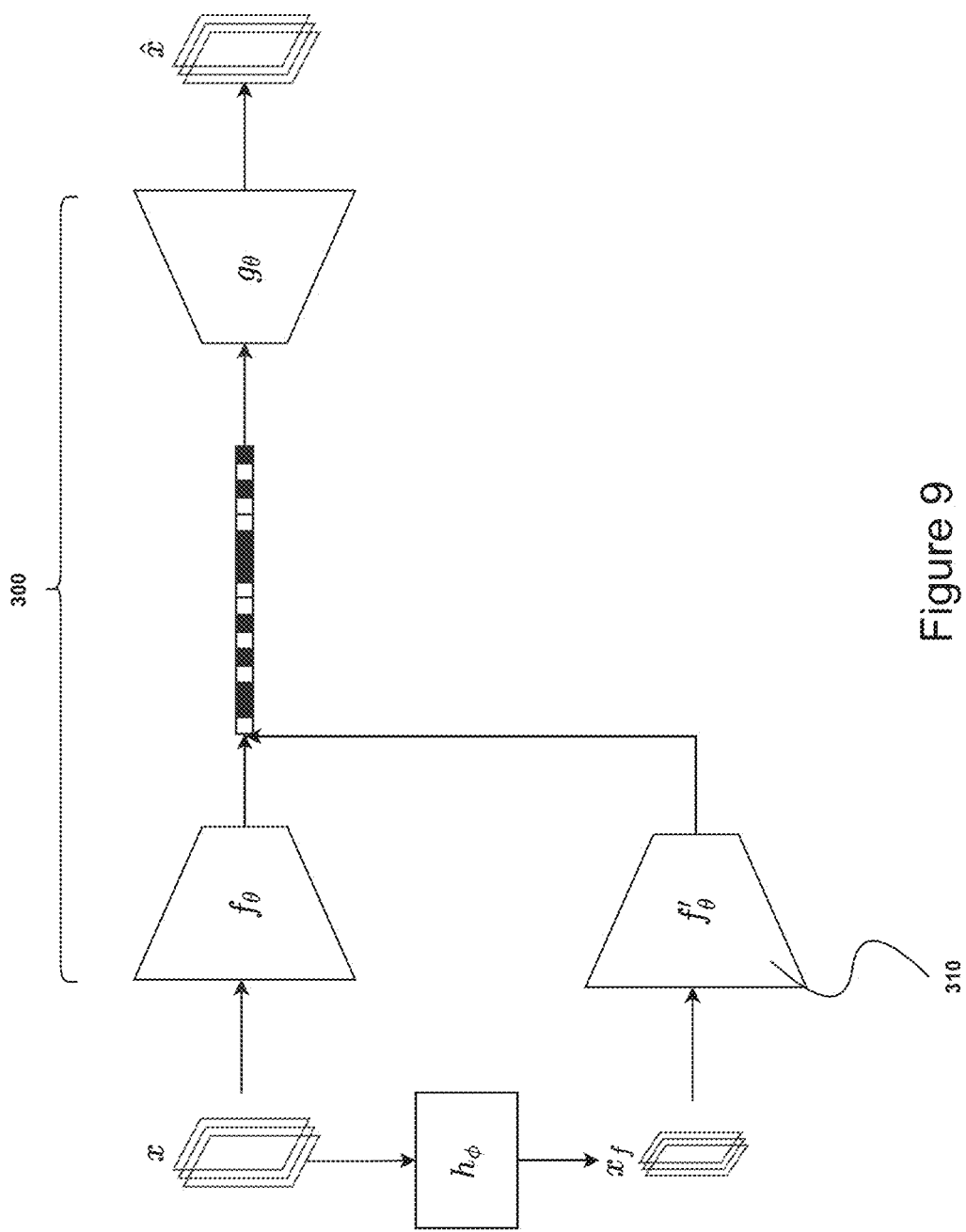

FIG. 9 illustrates a further example of an image or video compression, transmission and decompression pipeline according to the present invention.

Figure 10:
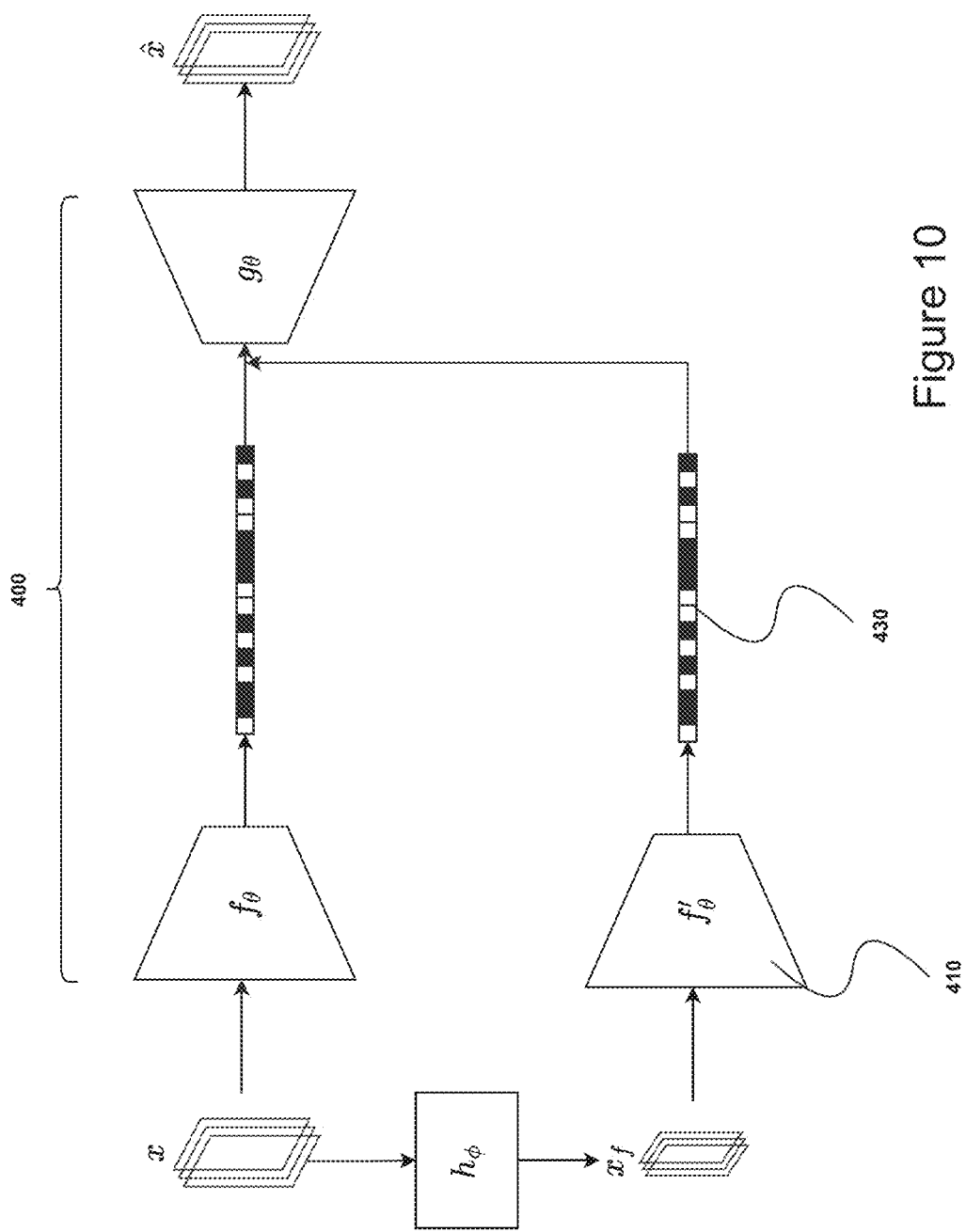

FIG. 10 illustrates a further example of an image or video compression, transmission and decompression pipeline according to the present invention.

Compression processes may be applied to any form of information to reduce the amount of data, or file size, required to store that information. Image and video information is an example of information that may be compressed. The file size required to store the information, particularly during a compression process when referring to the compressed file, may be referred to as the rate. In general, compression can be lossless or lossy. In both forms of compression, the file size is reduced. However, in lossless compression, no information is lost when the information is compressed and subsequently decompressed. This means that the original file storing the information is fully reconstructed during the decompression process. In contrast to this, in lossy compression information may be lost in the compression and decompression process and the reconstructed file may differ from the original file. Image and video files containing image and video data are common targets for compression. JPEG, JPEG2000, AVC, HEVC and AVI are examples of compression processes for image and/or video files.

In a compression process involving an image, the input image may be represented as x. The data representing the image may be stored in a tensor of dimensions H×W×C, where H represents the height of the image, W represents the width of the image and C represents the number of channels of the image. Each H×W data point of the image represents a pixel value of the image at the corresponding location. Each channel C of the image represents a different component of the image for each pixel which are combined when the image file is displayed by a device. For example, an image file may have 3 channels with the channels representing the red, green and blue component of the image respectively. In this case, the image information is stored in the RGB colour space, which may also be referred to as a model or a format. Other examples of colour spaces or formats include the CMKY and the YCbCr colour models. However, the channels of an image file are not limited to storing colour information and other information may be represented in the channels.

The output image may differ from the input image and is represented by $\hat{x}'$. The difference between the input image and the output image may be referred to as distortion or a difference in image quality. The distortion can be measured using any distortion function which receives the input image and the output image and provides an output which represents the difference between input image and the output image in a numerical way. An example of such a method is using the mean square error (MSE) between the pixels of the input image and the output image, but there are many other ways of measuring distortion, as will be known to the person skilled in the art. The distortion function may comprise a trained neural network.

Typically, the rate and distortion of a lossy compression process are related. An increase in the rate may result in a decrease in the distortion, and a decrease in the rate may result in an increase in the distortion. Changes to the distortion may affect the rate in a corresponding manner. A relation between these quantities for a given compression technique may be defined by a rate-distortion equation.

AI based compression processes may involve the use of neural networks. A neural network is an operation that can be performed on an input to produce an output. A neural network may be made up of a plurality of layers. The first layer of the network receives the input. One or more operations may be performed on the input by the layer to produce an output of the first layer. The output of the first layer is then passed to the next layer of the network which may perform one or more operations in a similar way. The output of the final layer is the output of the neural network.

Each layer of the neural network may be divided into nodes. Each node may receive at least part of the input from the previous layer and provide an output to one or more nodes in a subsequent layer. Each node of a layer may perform the one or more operations of the layer on at least part of the input to the layer. For example, a node may receive an input from one or more nodes of the previous layer. The one or more operations may include a convolution, a weight, a bias and an activation function. Convolution operations are used in convolutional neural networks. When a convolution operation is present, the convolution may be performed across the entire input to a layer. Alternatively, the convolution may be performed on at least part of the input to the layer.

Each of the one or more operations is defined by one or more parameters that are associated with each operation. For example, the weight operation may be defined by a weight matrix defining the weight to be applied to each input from each node in the previous layer to each node in the present layer. In this example, each of the values in the weight matrix is a parameter of the neural network. The convolution may be defined by a convolution matrix, also known as a kernel. In this example, each of the values in the convolution matrix is a parameter of the neural network. The activation function may also be defined by values which may be parameters of the neural network. The parameters of the network may be varied during training of the network.

Other features of the neural network may be predetermined and therefore not varied during training of the network. For example, the number of layers of the network, the number of nodes of the network, the one or more operations performed in each layer and the connections between the layers may be predetermined and therefore fixed before the training process takes place. These features that are predetermined may be referred to as the hyperparameters of the network. These features are sometimes referred to as the architecture of the network.

To train the neural network, a training set of inputs may be used for which the expected output, sometimes referred to as the ground truth, is known. The initial parameters of the neural network are randomized and the first training input is provided to the network. The output of the network is compared to the expected output, and based on a difference between the output and the expected output the parameters of the network are varied such that the difference between the output of the network and the expected output is reduced. This process is then repeated for a plurality of training inputs to train the network. The difference between the output of the network and the expected output may be defined by a loss function. The result of the loss function may be calculated using the difference between the output of the network and the expected output to determine the gradient of the loss function. Back-propagation of the gradient descent of the loss function may be used to update the parameters of the neural network using the gradients dL/dy of the loss function. A plurality of neural networks in a system may be trained simultaneously through back-propagation of the gradient of the loss function to each network.

In the case of AI based image or video compression, the loss function may be defined by the rate distortion equation. The rate distortion equation may be represented by Loss=D+ $\lambda$*R, where D is the distortion function, $\lambda$ is a weighting factor, and R is the rate loss. $\lambda$ may be referred to as a lagrange multiplier. The langrange multiplier provides as weight for a particular term of the loss equation in relation to each other term and can be used to control which terms of the loss equation are favoured when training the network.

In the case of AI based image or video compression, a training set of input images may be used. An example training set of input images is the KODAK image set (for example at www.cs.albany.edu/xypan/research/snr/Kodak.html). An example training set of input images is the IMAX image set. An example training set of input images is the Imagenet dataset (for example at www.image-net.org/download). An example training set of input images is the CLIC Training Dataset P ("professional") and M ("mobile") (for example at http://challenge.compression.cc/tasks/).

Figure 1:
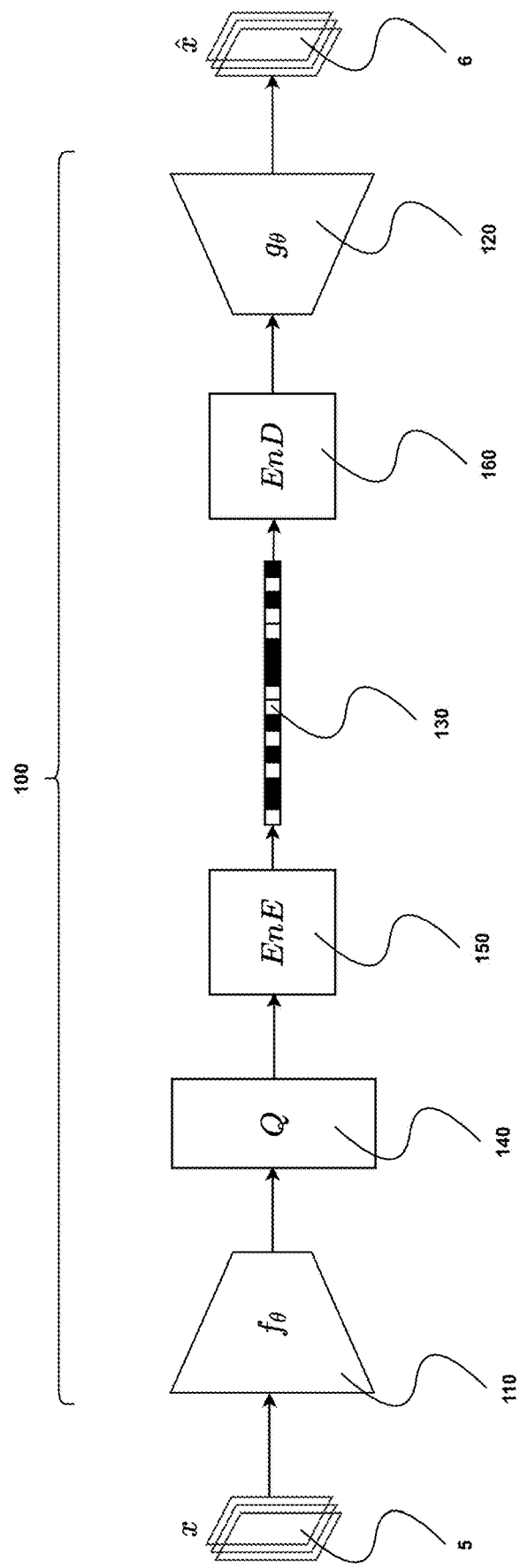
FIG. 1 illustrates an example of an image or video compression, transmission and decompression pipeline.

An example of an AI based compression process 100 is shown in FIG. 1. As a first step in the AI based compression process, an input image 5 is provided. The input image 5 is provided to a trained neural network 110 characterized by a function $f_\theta$ acting as an encoder. The encoder neural network 110 produces an output based on the input image. This output is referred to as a latent representation of the input image 5. In a second step, the latent representation is quantised in a quantisation process 140 characterised by the operation Q, resulting in a quantized latent. The quantisation process transforms the continuous latent representation into a discrete quantized latent.

In a third step, the quantized latent is entropy encoded in an entropy encoding process 150 to produce a bitstream 130. The entropy encoding process may be for example, range or arithmetic encoding. In a fourth step, the bitstream 130 may be transmitted across a communication network.

In a fifth step, the bitstream is entropy decoded in an entropy decoding process 160. The quantized latent is provided to another trained neural network 120 characterized by a function $g_\theta$ acting as a decoder, which decodes the quantized latent. The trained neural network 120 produces an output based on the quantized latent. The output may be the output image of the AI based compression process 100. The encoder-decoder system may be referred to as an autoencoder.

The system described above may be distributed across multiple locations and/or devices. For example, the encoder 110 may be located on a device such as a laptop computer, desktop computer, smart phone or server. The decoder 120 may be located on a separate device which may be referred to as a recipient device. The system used to encode, transmit and decode the input image 5 to obtain the output image 6 may be referred to as a compression pipeline.

Figure 2:
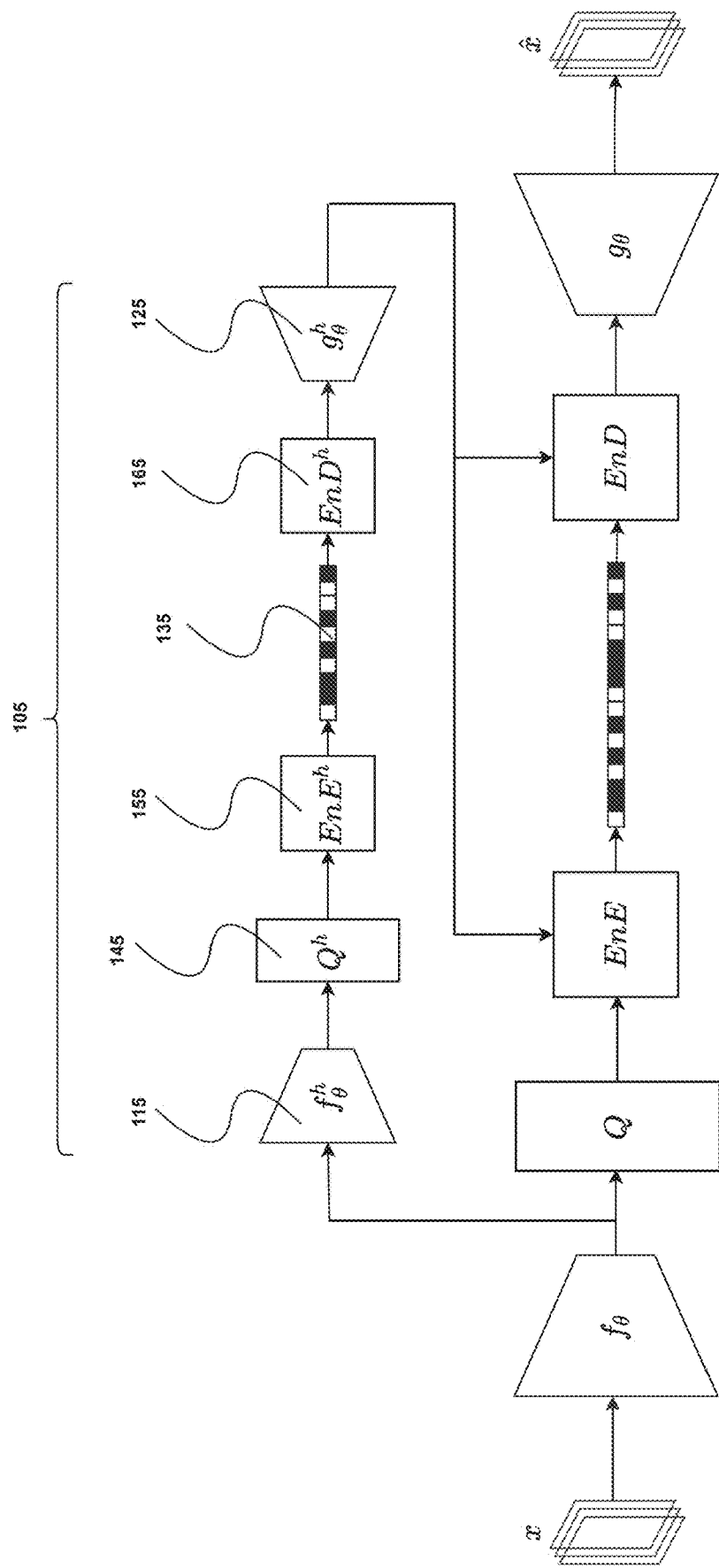
FIG. 2 illustrates a further example of an image or video compression, transmission and decompression pipeline including a hyper-network

The AI based compression process may further comprise a hyper-network 105 for the transmission of meta-information that improves the compression process. The hyper-network 105 comprises a trained neural network 115 acting as a hyper-encoder $f_\theta^h$ and a trained neural network 125 acting as a hyper-decoder $g_\theta^h$. An example of such a system is shown in FIG. 2. Components of the system not further discussed may be assumed to be the same as discussed above. The neural network 115 acting as a hyper-decoder receives the latent that is the output of the encoder 110. The hyper-encoder 115 produces an output based on the latent representation that may be referred to as a hyper-latent representation. The hyper-latent is then quantized in a quantization process 145 characterised by $Q^h$ to produce a quantized hyper-latent. The quantization process 145 characterised by $Q^h$ may be the same as the quantisation process 140 characterised by Q discussed above.

In a similar manner as discussed above for the quantized latent, the quantized hyper-latent is then entropy encoded in an entropy encoding process 155 to produce a bitstream 135. The bitstream 135 may be entropy decoded in an entropy decoding process 165 to retrieve the quantized hyper-latent. The quantized hyper-latent is then used as an input to trained neural network 125 acting as a hyper-decoder. However, in contrast to the compression pipeline 100, the output of the hyper-decoder is not an approximation of the input to the hyper-decoder 115. Instead, the output of the hyper-decoder is used to provide parameters for use in the entropy encoding process 150 and entropy decoding process 160 in the main compression process 100. For example, the output of the hyper-decoder 125 can include one or more of the mean, standard deviation, variance or any other parameter used to describe a probability model for the entropy encoding process 150 and entropy decoding process 160 of the latent representation. In the example shown in FIG. 1a, only a single entropy decoding process 165 and hyper-decoder 125 is shown for simplicity. However, in practice, as the decompression process usually takes place on a separate device, duplicates of these processes will be present on the device used for encoding to provide the parameters to be used in the entropy encoding process 150.

To perform training of the AI based compression process described above, a training set of input images may be used as described above. During the training process, the parameters of both the encoder 110 and the decoder 120 may be simultaneously updated in each training step. If a hyper-network 105 is also present, the parameters of both the hyper-encoder 115 and the hyper-decoder 125 may additionally be simultaneously updated in each training step The training process may further include a generative adversarial network (GAN). When applied to an AI based compression process, in addition to the compression pipeline described above, an additional neutral network acting as a discriminator is included in the system. The discriminator receives an input and outputs a score based on the input providing an indication of whether the discriminator considers the input to be ground truth or fake. For example, the indicator may be a score, with a high score associated with a ground truth input and a low score associated with a fake input. For training of a discriminator, a loss function is used that maximizes the difference in the output indication between an input ground truth and input fake.

When a GAN is incorporated into the training of the compression process, the output image 6 may be provided to the discriminator. The output of the discriminator may then be used in the loss function of the compression process as a measure of the distortion of the compression process. Alternatively, the discriminator may receive both the input image 5 and the output image 6 and the difference in output indication may then be used in the loss function of the compression process as a measure of the distortion of the compression process. Training of the neural network acting as a discriminator and the other neutral networks in the compression process may be performed simultaneously. During use of the trained compression pipeline for the compression and transmission of images or video, the discriminator neural network is removed from the system and the output of the compression pipeline is the output image 6.

Incorporation of a GAN into the training process may cause the decoder 120 to perform hallucination. Hallucination is the process of adding information in the output image 6 that was not present in the input image 5. In an example, hallucination may add fine detail to the output image 6 that was not present in the input image 5 or received by the decoder 120. The hallucination performed may be based on information in the quantized latent received by decoder 120.

Figure 3:
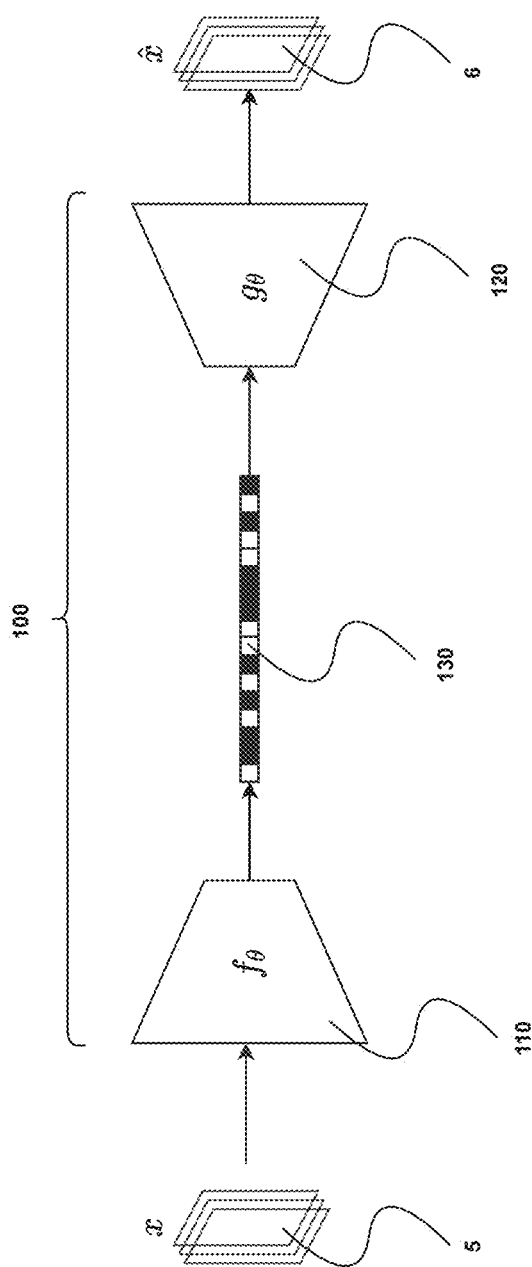
FIG. 3 illustrates a further example of an image or video compression, transmission and decompression pipeline.

To consider the compression process described above in further detail, begin by considering an image $x \in \mathbb{R}^{C \times H \times W}$, where C are the channels, H is the pixel height, and W is the pixel width. Now consider a simplified learned image compression framework based on an autoencoder. In one instance, we define our encoder $f: \mathbb{R}^{C \times H \times W} \to \mathbb{R}^{4C \times H/4 \times W/4}$ and decoder $g: \mathbb{R}^{4C \times H/4 \times W/4} \to \mathbb{R}^{C \times H \times W}$ functions such that $$f_\theta(x)=y, \quad (1)$$

$$Q(Y)=\hat{y}, \quad (2)$$

$$g_\theta(\hat{y})=\hat{x}, \quad (3)$$

where y is a low-dimensional latent variable representation of x, Q is a quantization function necessary for sending y as a bitstream, $\hat{y}$ are the quantized latent variables, $\hat{x}$ is a noisy reconstruction of our input image, and θ are the parameters of the functions $f$ and $g$, usually represented by neural networks. An example of such a system is illustrated in FIG. 3. An input image 5 of three red-green-blue colour channels x, is passed to a neural network 110 acting as encoder $f_\theta$. The output is quantized and turned into a bitstream 130 using a range encoder. The neural network 120 acting as a decoder, $f_\theta$, then decodes the bitstream, and attempts to reconstruct x. The quantisation process and entropy encoding and decoding process are not shown in FIG. 2 for simplicity. Stochastic optimisation techniques, such as stochastic gradient descent, can then be used to optimise θ subject to the minimization of the canonical rate-distortion objective $$\mathcal{L}_c = \mathbb{E}_{x \sim p_x}[\lambda_1 r(\hat{y};\xi)+d(x,\hat{x})], \quad (4)$$

where $p_x$ is the distribution of natural images, $r(\hat{y})$ is the rate measured using an entropy model (i.e. a discretized probability density function parameterized by $\xi$), $\lambda_1$ is the Lagrange multiplier and $d(x, \hat{x})$ is some measure of distortion.

We note that, in practice, we would often augment this autoencoder to include a hyper-encoder and hyper-decoder: an auxiliary autoencoder used to predict entropy parameters. These functions, $f^h: \mathbb{R}^{4C \times H/4 \times W/4} \to \mathbb{R}^{4C \times H/16 \times W/16}$ and $g^h: \mathbb{R}^{4C \times H/4 \times W/4} \to \mathbb{R}^{4C \times H/16 \times W/16}$, would then operate as follows $$f_\theta^h(y)=z, \quad (5)$$

$$Q(z)=\hat{z}, \quad (6)$$

$$g_\theta^h(\hat{z})=\xi. \quad (7)$$

In such a case, (4) would become $$\mathcal{L}_c = \mathbb{E}_{x \sim p_x}[\lambda_1(r(\hat{y};\xi)+r(\hat{z};\psi))+d(x,\hat{x})], \quad (8)$$

where ψ are the parameters of the hyper-entropy model.

When calculating distortion, one might use a pixel-wise loss like mean-squared error (MSE) to quantify the measure of perceptual quality. Whilst this reliably produces plausible reconstructions when combined with (4), it is well-known to correlate poorly with the human visual system (HVS). Indeed, what we would prefer is a differentiable measure of reconstruction quality that better correlates with the perceived visual quality of the HVS. One promising approach to this problem is to introduce a generative adversarial network (GAN) into our learned compression framework. Here we posit an adversarial optimisation problem between our de facto generator, $g_\theta(y)$, and some discriminator function D: the discriminator attempts to distinguish between 'real' and 'fake' images (x and $\hat{x}$', respectively); the generator attempts to produce 'fake' images indistinguishable to the discriminator from the 'real' samples, x. Under such a formulation, we train using a bi-level approach at each iteration. We begin by training our discriminator using, in one instance, the "non-saturating loss" as described in "Ian Goodfellow, Jean Pouget-Abadie, Mehdi Mirza, Bing Xu, David Warde-Farley, Sherjil Ozair, Aaron Courville, and Yoshua Bengio. Generative adversarial nets. In Advances in neural information processing systems, pages 2672-2680, 2014" which is hereby incorporated by reference.

$$\mathcal{L}_d = \mathbb{E}_{x \sim p_x}[-\log(1-D(\hat{x},\hat{y}))]+\mathbb{E}_{x \sim p_x}[-\log(D(x,\hat{y}))], \quad (9)$$

where we choose, in one instance, D to be a conditional discriminator, favoured for its propensity to produce sharper reconstructions. We then augment our rate-distortion objective of (4) to include a term for our discriminator $$\mathcal{L}_c = \mathbb{E}_{x \sim p_x}[\lambda_1 r(\hat{y})+d(x,\hat{x})-\lambda_2 D(\hat{x},\hat{y})], \quad (10)$$

which encourages the synthesis of natural-looking textures and patterns. In one instance, $d(x,\hat{x})$ may be a composite of distortion metrics, such that $$d(x,\hat{x})=\lambda_3 \text{MSE}(x,\hat{x})+\lambda_4 \text{LPIPS}(x,\hat{x}), \quad (11)$$

where MSE is mean-squared error and LPIPS is the Learned Perceptual Image Patch Similarity as referred to in "Richard Zhang, Phillip Isola, Alexei A Efros, Eli Shechtman, and Oliver Wang. The unreasonable effectiveness of deep features as a perceptual metric. In Proceedings of the IEEE conference on computer vision and pattern recognition, pages 586-595, 2018" which is hereby incorporated by reference.

Under this and related formulations, it has proven possible to successfully combine autoencoders with GANs to achieve state-of-the-art perceptual quality results as discussed in "Fabian Mentzer, George D Toderici, Michael Tschannen, and Eirikur Agustsson. High-fidelity generative image compression. Advances in Neural Information Processing Systems, 33, 2020" and "Eirikur Agustsson, Michael Tschannen, Fabian Mentzer, Radu Timofte, and Luc Van Gool. Generative adversarial networks for extreme learned image compression. In Proceedings of the IEEE International Conference on Computer Vision, pages 221-231, 2019", which are hereby incorporated by reference. However, despite their obvious utility—especially at synthesising texture in natural scenery—combining GANs and autoencoders for learned image and video compression exhibits a number of potent failure modes.

Figure 4:
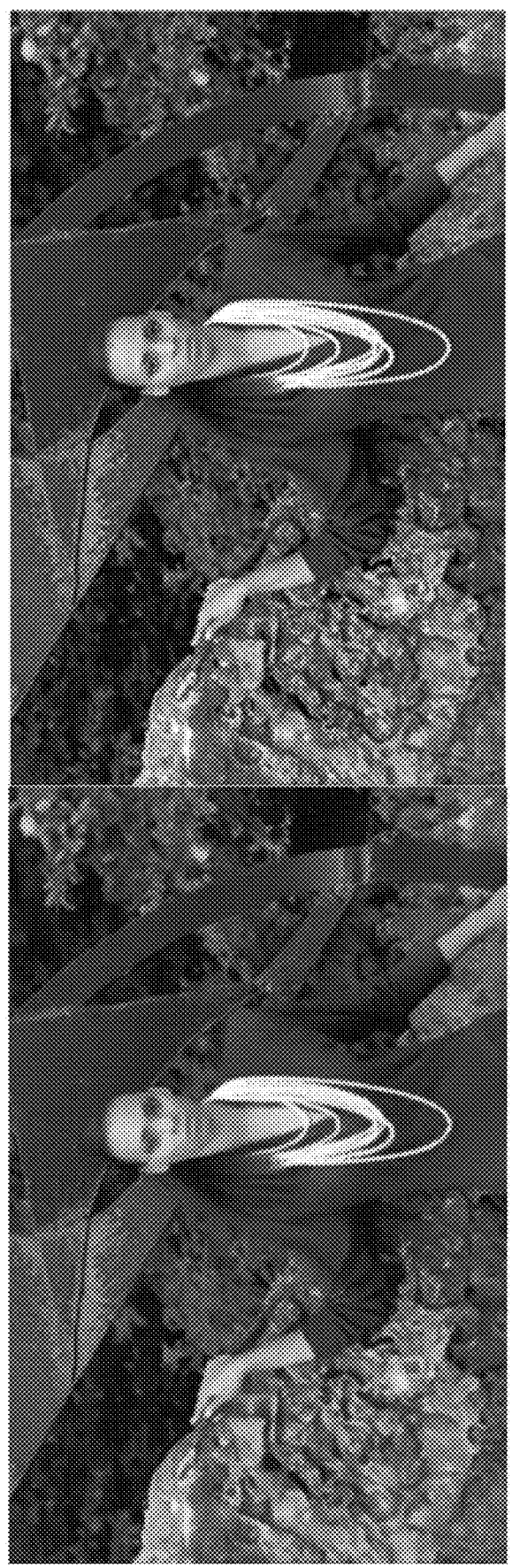
FIG. 4 illustrates an image compressed and decompressed using an AI based compression and decompression process on the left and the original image on the right.

Empirically, it is observed that such networks struggle when compressing regions of high visual sensitivity that represent a small number of absolute image pixels. This includes—but is not limited to—human faces. An example of such a failure mode is exhibited in FIG. 4, where the face of interest is smaller than 128×128 pixels. The left image in FIG. 4 is a compressed image synthesised with the addition of a discriminator. The right image is the original input image. We draw the viewer's attention to the distortion present in the face, a region of high visual sensitivity. In contrast, the rest of the compressed image does not exhibit such extreme visual differences. The methods discussed below can reduce such distortion, in particular in AI based compression systems using GANs.

Given a GAN as described above, we now seek to define architectural modifications that permit higher bit allocation, conditioned on image or frame context. A modification is the introduction of at least a further encoder directed to areas of high visual sensitivity in an image or frame of video. For purposes of illustration only, we shall focus our attention on the above-mentioned failure mode of small faces, as demonstrated in FIG. 4. However, the concepts described herein are not limited to human faces and may be applied to any category of region of high visual sensitivity, such as human hands, animal faces or text.

Regions of a high visual sensitivity are regions of an image or frame of a video that are of particular interest to a human viewer. Such regions of interest may be defined in a number of ways. For example, the region may be defined as an area of an image with higher average salience than the whole image. The region may also be defined as an area which a human viewer would focus on in an image. The region may be defined by a particular feature, such as a human face or the other alternatives set out above. The region may be defined by the extent of the particular feature. For example, in the case of a human face the area of the region may be defined by the top and bottom and two sides of the human face. Alternatively, the pixels forming the region may be determined as set out in greater detail below.

We note that all discussed techniques can be applied to arbitrarily many regions-of-interest in an image. This further means that the number of encoders and/or decoders is in reality variable depending on the complexity of the variable bit-allocation. For the examples in this section, it is for simplicity limited to faces, which limits the required number of encoders and decoders for some of the methods described in later sections to a maximum of two. Further categories of regions of high visual sensitivity may require at least one further encoder.

Begin by considering a function $h_\phi$, which may be a neural network with parameters $\phi$, responsible for face detection, such that $$h_\phi(x) = m, \tag{12}$$

where $m \in \mathbb{R}^{1 \times H \times W}$ is a binary mask. A one in m indicates the presence of a face in the corresponding pixel of x; a zero indicates the absence of a face in the corresponding pixel of x. In one instance, $h_\phi$ is trained before training $f_\theta$, $g_\theta$ and D. In another instance, $h_\phi$ is trained in conjunction with $f_\theta$, $g_\theta$ and D. Given a binary mask m, we can proceed to allocate more bits to faces in a number of ways. These approaches are detailed as follows.

In one instance, we may train a separate face-specific autoencoder, used to compress faces only. Trained on a face-only dataset separately, and the adversarial objectives of (9) and (10), it permits a much richer latent-variable representation of faces, as compared to an autoencoder used for the distribution of all natural images, $p_x$. Let us define the face-specific autoencoder, and its latent variable representation, as follows $$f_\theta'(x_f) = y_f, \tag{13}$$

$$g_\theta'(\hat{y}_f) = \hat{x}_f, \tag{14}$$

where $x_f$ are the faces extracted from x using m.

Figure 5:
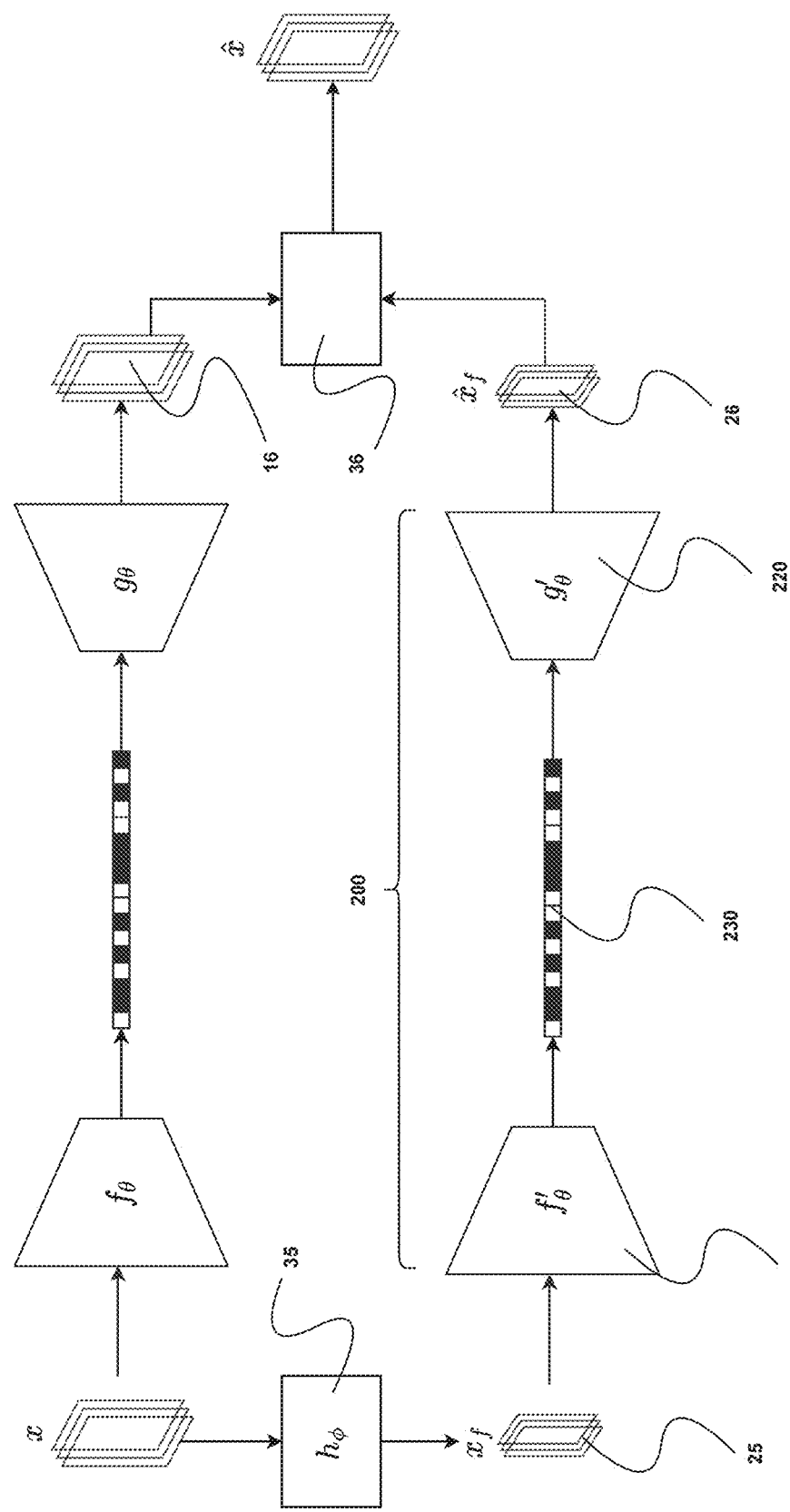
FIG. 5 illustrates an example of an image or video compression, transmission and decompression pipeline according to the present invention.

An example of such an arrangement is shown in FIG. 5. In addition to the system components shown discussed in FIG. 3, the input image 5 is processed by function 35 represented by $h_\phi$, which may be a neural network. The function 35 identifies regions of interest such as faces in the input image 5 which are separated as one or more images $x_f$ as one or more identified regions 25. The one or more identified regions 25 identified by the function 35 are passed through a separate compression pipeline 200. The one or more identified regions 25 are initially passed through a separate neural network 210 acting as an encoder $f_\theta'$. The output of the separate encoder $f_\theta'$ is quantised, range encoded and sent through a separate bitstream 230 and decoded by a neural network 220 acting as a decoder $g_\theta'$ to produce an output region image 26 represented by $\hat{x}_f$ that attempts to reconstruct the one or more identified regions 25.

The one or more identified regions 25 may each be a crop of a single region of interest in the input image 5. In this case, multiple identified regions may be associated with a single input image 5 if the input image 5 contains multiple regions of interest. Spatial information detailing the location of each of the plurality of regions of interest may also be sent in the bitstream 230. Alternatively, the one or more identified regions 25 may be represented in a single image corresponding to the input image where all information is removed from areas of the single image corresponding to the non-identified regions of the input image 5. Representing the one or more identified regions 25 in a single image may reduce the runtime of the compression process.

Each reconstructed output region image 26 can then be inserted back into the base reconstruction of the output image 6 using the spatial information, for example using Poission blending as set out below.

In one instance, we would extend this to include an additional region of interest specific hyper-encoder and hyper-decoder (henceforth simply referred to as a hyper-network). The region of interest specific hyper encoder and hyper decoder may be implemented in the same way as the hyper encoder and hyper decoder for the input image 5 described above.

We further note it may be practically necessary to run the compression process described above for multiple regions of interest such as faces of a particular type in an image, such that $$f_\theta'(x_f^{(i)}) = y_f^{(i)}, \tag{15}$$

$$g_\theta'(\hat{y}_f^{(i)}) = \hat{x}_f^{(i)}, \tag{16}$$

where $\hat{x}_f^{(i)}$ is the $i^{th}$ face in x. In one instance, each $\hat{x}_f^{(i)}$ is a crop of x to only the pixels representing faces. We note that $f_{f'}$ and $g_\theta'$ are pre-trained, and are therefore not accessible to the gradient flow of (10) when training $f_\theta$ and $g_\theta$. As such, no modifications to (10) are required.

We may append the binary mask m to the input image 5. For example, the mask m may be added as an additional channel to the input image 5. In this way, the encoder 110 learns to allocate a minimal number of bits to facial regions in its latent representation, $\hat{y}$. Using this formulation, it is then possible to append $\hat{y}_f$ to the bitstream of $\hat{y}$. As discussed above, in the case where the one or more identified regions 25 are cropped to the region of interest, in order to preserve the spatial location of each $\hat{x}_f^{(i)}$ it is additionally required to send a small bitstream of spatial meta-information (i.e. the coordinates for one corner of the face $\hat{x}_f^{(i)}$). In practice, however, this is a trivial number of bits. For example, in a 4096×4096 image with 10 faces, an additional 0.000007 bits per pixel (bpp) is used. We further note that, in practice, an autoencoder trained for face compression will compress faces more efficiently than a network trained for all natural images, further reducing the additional bpp.

When a separate compression process 200 is used, the output of the neural network 120 acting as a decoder associated with the input image may be considered an intermediate image 16 as an output of the neural network. The intermediate image 16 and set of output region images 26 may be combined by a function 36 acting as a combiner. Given an intermediate image 16 which is an everything-but-faces reconstruction $\hat{x}$ (from henceforth called our base reconstruction) and a set of output region images 26 which is a set of n compressed faces we may, in one instance, combine our faces and base reconstruction using a parametric function like Poisson blending as described for example in "Patrick Pérez, Michel Gangnet, and Andrew Blake. Poisson image editing. ACM Trans. Graph., 22(3), 2003" which is hereby incorporated by reference.

Alternatively, the function 36 acting as a combiner may be a post-processing function, $l(\hat{x}', \hat{x}_f)$, where the output region images 26 may be faces that are arranged in a zero-tensor of dim(x) using the spatial meta-information. This function may be a neural network with parameters trained using stochastic gradient descent and an appropriate objective function. In one instance, the training of l happens concurrently with $f_\theta$, $g_\theta$ and D; in another instance, l is trained after training $f_\theta$, $g_\theta$ and D.

Alternatively, intermediate layers of the neural networks 120,220 acting as decoders $g_\theta$ and $g_\theta'$ may be combined to produce an output image 5. In one instance, this is achieved through the addition of the second-to-last intermediate layer of $g_\theta'$ to that of $g_\theta$, before passing this to the final layer of $g_\theta$ as to output the output image 5.

An example of the result of using a separate compression process 200 to compress faces recognised by $h_\phi$ is shown in FIG. 6. We note here that in comparison to the result without additional bit considerations we are able to significantly improve the quality of the reconstructed face, and ergo the perceived image quality. The image on the left of FIG. 6 shows a compressed image synthesised with the addition of a discriminator. The image on the right of FIG. 6 shows a compressed image synthesised with the addition of a discriminator and an additional compression process 200.

Further examples of the use of the separate compression process 200 are shown in FIG. 7 and FIG. 8. FIG. 7 shows the application of the process to multiple faces in an image. The image on the left of FIG. 7 shows a compressed image synthesised with the addition of a discriminator. The image on the right of FIG. 7 shows a compressed image synthesised with the addition of a discriminator and an additional compression process 200. FIG. 8 shows the application of the process to an image containing text. The left image shows a compressed image synthesised with the addition of a discriminator. The right image shows a compressed image synthesised with the addition of a discriminator and an additional compression process 200.

One possible limitation of the approach outlined above is that it requires two neural networks acting as decoders. In an appeal to greater computational efficiency and enhanced inference speed, we now propose two architectures that require the use of only one decoder. These approaches can be categorised by their incorporation of additional information into the base latent representation: either before or after sending the bitstream. Features of the compression process not discussed in detail below may be considered equivalent to the features discussed above.

Recall our face-specific encoder as introduced above $$f_\theta'(x_f) = y_f. \tag{17}$$

In order to preserve the use of only one decoder, we may merge the latent variables $y_f$ and y pre-quantization. An example of such a compression process 300 is illustrated in FIG. 9. After the one or more identified regions 25 have been encoded by the neural network 310 acting as an encoder, the latent representations of the one or more identified regions are combined with the latent representation of the input image 5 before being quantized, entropy encoded and transmitted in the bitstream 130 as discussed above.

The merging of the latent variables may retain only 4C channels, such that the output is given by $$y_{m^+} = \overline{m} \cdot y_f, \tag{18}$$

$$y_{m^-} = (1-\overline{m}) \cdot y, \tag{19}$$

$$y_m = y_{m^+} + y_{m^-}, \tag{20}$$

where $\overline{m}$ is the down-sampled binary face mask, $y_{m^+}$ and $y_{m^-}$ pertain to the latent variables of 'positive' and 'negative' face regions, and $y_m$ represents the merged latent variable representation. We note that this approach further eschews the need to send spatial meta-information. In one instance, $y_m$ is used as an input to a hyper-network used to generate the entropy parameters for arithmetic encoding. In one instance, $f_\theta'$ is the encoder from a pre-trained face compression network. In another instance, $f_\theta'$ is trained in conjunction with $f_\theta$, $g_\theta$ and D in a so-called end-to-end fashion. In such a case, we may encourage higher bit allocations in $\hat{y}_{m^+}$ by evaluating its rate separately with a smaller Lagrange multiplier in (9), where we augment the objective of (10) to become $$\mathcal{L}_c = \mathbb{E}_{x \sim p_x} [\lambda_1 r(\hat{y}_{m^-}) + \lambda_5 r(\hat{y}_{m^+}) + d(x, \hat{x}') - \lambda_2 D(\hat{x}, \hat{y}_m)]. \tag{21}$$

We may further append m to the input of $f_\theta$. In this way, $f_\theta$ learns to allocate a minimal number of bits to facial regions in its latent representation, $\hat{y}$.

In another instance, the latent representations may be combined after quantization has been performed. An example of such a compression process 400 is illustrated in FIG. 10. After the one or more identified regions 25 have been encoded by the neural network 410 acting as an encoder, quantization of the latent representation of the image and the latent representations of the one or more identified regions is performed separately. This results in a separate bitstream 430 associated with the quantized latent of the one or more identified regions. The bitstreams may subsequently be combined prior to entropy decoding and being decoded to produce an output image 6 as discussed above.

For example, we may augment the channels of our quantized latent variable representation such that we have some $\hat{y}_c \in \mathbb{R}^{(4C+B) \times H/4 \times W/4}$, and reserve the last B channels for facial regions identified by $h_\phi$. This includes, but is not limited to, the case of 4C=B. This approach proceeds as follows.

Begin by considering two encoders (1) and (17) subject to quantization $$Q(f_\theta(x)) = \hat{y}, \tag{22}$$

$$Q(f_\theta'(x_f^{(i)})) = \hat{y}_f^{(i)}. \tag{23}$$

Now define the concatenated latent representation of the quantized latent variables post-transmission in the bitstream $$\hat{y}_c = [\hat{y}, \hat{y}_f], \tag{24}$$

where [•, •] represents concatenation along the channel dimension, and $\hat{y}_f$ represents one (or many) faces $\hat{y}_f^{(i)}$ inserted into a zero-tensor of dim($\hat{y}$) using spatial meta-information. (In practice, it would be required to encode and send each $\hat{y}_f^{(i)}$ separately, which is then compiled into a single $\hat{y}_f$ decoder-side.) It is then possible to decode $\hat{y}_c$ using a modified decoder with additional input channels $f: \mathbb{R}^{(4C+B) \times H/4 \times W/4} \to \mathbb{R}^{C \times H \times W}$ such that $$f_\theta(\hat{y}_c) = \hat{x}. \quad (25)$$

In one instance, $f_\theta'$ is the encoder from a pre-trained face compression network. In another instance, $f_\theta'$ is trained in conjunction with $f_\theta$, $g_\theta$ and D in a so-called end-to-end fashion. In such a case, we may encourage higher bit allocations in $\hat{y}_f$ by evaluating its rate separately with a smaller Lagrange multiplier in (9), where we augment the objective of (10) to become $$\mathcal{L}_c = \mathbb{E}_{x \sim p_x}[\lambda_1 r(\hat{y}) + \lambda_5 r(\hat{y}_f) + d(x, \hat{x}) - \lambda_2 D(\hat{x}, \hat{y}_c)]. \quad (26)$$

We may append the binary mask m to the input image 5. For example, the mask m may be added as an additional channel to the input image 5. In this way, the encoder 110 learns to allocate a minimal number of bits to facial regions in its latent representation, $\hat{y}$.

In the instance of incorporating a hyper-network into the above formulation, we consider two implementations. In the first instance, we define a secondary hyper-encoder only (i.e. we retain only a single hyper-decoder, with two hyper-encoders). Define this second hyper-encoder as $f_{f,\theta}^h$ where the the quantized hyper-latent variables are available according to $$f_\theta^h(y) = z, \quad (27)$$

$$f_{f,\theta}^h(y_f^{(i)}) = z_f^{(i)}, \quad (28)$$

$$Q(z) = \hat{z}, \quad (29)$$

$$Q(z_f^{(i)}) = \hat{z}_f^{(i)}. \quad (30)$$

The entropy parameters for arithmetic encoding can then be predicted as follows $$g_\theta^h([\hat{z}, \hat{z}_f]) = \xi,$$

where [•, •] represents concatenation along the channel dimension and $\hat{z}_f$ are faces arranged in a zero-tensor of dim(z) using spatial meta-information. In the second instance, we define only one hyper-encoder, and perform channel-wise concatenation of y and $y_f$ prior to transformation as a single z tensor, such that $$f_\theta^h([\hat{y}, \hat{y}_f]) = z, \quad (31)$$

$$Q(z) = \hat{z}, \quad (32)$$

$$g_\theta^h(\hat{z}) = \xi, \quad (33)$$

where $\hat{y}_f$ are faces arranged in a zero-tensor of dim(y) using spatial meta-information. In such a case, we eschew the need to send each $z_f^{(i)}$ individually, and rely on the encoding efficiency of $f_\theta^h$ to avoid the unnecessary encoding of zero-valued latent variables used in the creation of $y_f$.

The invention claimed is:

1. A method for lossy image or video encoding, transmission and decoding, the method comprising the steps of:
   receiving an input image at a first computer system;
   encoding the input image using a first trained neural network to produce a latent representation;
   identifying one or more regions of the input image associated with high visual sensitivity;
   encoding the one or more regions of the input image associated with high visual sensitivity using a second trained neural network to produce one or more region latent representations;
   performing a quantization process on the latent representation and the one or more region latent representations;
   transmitting the result of the quantization process to a second computer system; and
   decoding the result of the quantization process to produce an output image, wherein the output image is an approximation of the input image.

2. The method of claim 1, wherein the one or more regions of the input image associated with high visual sensitivity are identified by a third trained neural network.

3. The method of claim 1, wherein the location of the areas of the one or more regions of the input image associated with high visual sensitivity are stored in a binary mask.

4. The method of claim 1, further comprising the step of transmitting location information identifying the location of the one or more of the regions of the input image associated with high visual sensitivity to the second computer system.

5. The method of claim 1, wherein the quantization process comprises quantizing the first latent representation to produce a quantized latent and quantizing the one or more region latent representations to produce one or more quantized region latents; and
   the step of transmitting the result of the quantization process comprises transmitting the quantized latent and the one or more quantized region latents.

6. The method of claim 5, wherein the step of decoding the result of the quantization process comprises:
   decoding the quantized latent using a fourth trained neural network to produce an intermediate image;
   decoding the one or more quantized region latents using a fifth trained neural network to produce one or more output region images; and
   combining the intermediate image and the one or more output region images to produce the output image.

7. The method of claim 6, wherein the intermediate image and the one or more region images are combined using Poisson Blending.

8. The method of claim 6, wherein the intermediate image and the one or more region images are combined using a sixth trained neural network.

9. The method of claim 5, wherein the step of decoding the result of the quantization process comprises:
   decoding the quantized latent and the one or more quantized region latents using a seventh trained neural network to produce the output image.

10. The method of claim 9, wherein the quantized latent and the one or more quantized region latents are input into separate layers of the seventh trained neural network; and
    information corresponding to each of the quantized latent and the one or more quantized region latents are both input into a subsequent layer of the seventh trained neural network.

11. The method of claim 5, wherein the method further comprises:
    combining the quantized latent and the one or more quantized region latents to produce a quantized combined latent;
    wherein the step of transmitting the result of the quantization process comprises transmitting the quantized combined latent.

12. The method of claim 11, wherein the step of decoding the result of the quantization process comprises decoding the quantized combined latent using an eighth trained neural network.

13. The method of claim 1, further comprising the step of merging the latent representation and the one or more region latent representations to produce a merged latent representation; and
   quantizing the merged latent representation to produce a quantized merged latent;
      wherein the step of transmitting the result of the quantization process comprises transmitting the quantized merged latent.

14. The method of claim 13, wherein the step of decoding the result of the quantization process comprises decoding the quantized merged latent using a ninth trained neural network.

15. The method of claim 1, wherein the one or more regions of high visual sensitivity includes a plurality of categories of region; and
   an additional trained neural network is used to encode each category of region during the encoding of the one or more regions of high visual sensitivity.

16. A method of training one or more neural networks, the one or more neural networks being for use in lossy image or video encoding, transmission and decoding, the method comprising the steps of:
   receiving a first input training image;
   encoding the first input training image using a first neural network to produce a latent representation;
   identifying one or more regions of the input image associated with high visual sensitivity;
   encoding the one or more regions of the input image associated with high visual sensitivity using a second trained neural network to produce one or more region latent representations;
   performing a quantization process on the latent representation and the one or more region latent representations;
   decoding the result of the quantization process to produce an output image, wherein the output image is an approximation of the input training image;
   evaluating a loss function based on differences between the output image and the input training image;
   evaluating a gradient of the loss function;
   back-propagating the gradient of the loss function through the first neural network to update the parameters of the first neural network; and
   repeating the above steps using a first set of training images to produce a first trained neural network.

17. The method of claim 16, further comprising, prior to the step of encoding the first input training image, performing the steps of:
   receiving a second input training image;
   encoding the second input training image using a second neural network to produce a latent representation;
   performing a quantization process on the latent representation;
   decoding the result of the quantization process to produce an output image, wherein the output image is an approximation of the second input training image
   evaluating a loss function based on differences between the output image and the second input training image;
   evaluating a gradient of the loss function;
   back-propagating the gradient of the loss function through the second neural network to update the parameters of the second neural network; and
   repeating the above steps using a second set of training images to produce a second trained neural network.

18. The method of claim 17, wherein the same set of training images is used to produce the first trained neural network and the second trained neural network.

19. The method of claim 16, wherein the difference between the output image and the input training image is determined by a neural network acting as a discriminator; and
   back-propagation of the gradient of the loss function is additionally used to update the parameters of the neural network acting as a discriminator.

20. A data processing system configured to perform the method of claim 1.

* * * * *